United States Patent [19]

Mok

[11] Patent Number: 5,500,688
[45] Date of Patent: Mar. 19, 1996

[54] SYNCHRONIZING SIGNAL CLAMPING CIRCUIT OF IMAGE SIGNAL PROCESSING INTEGRATED CIRCUIT

[75] Inventor: Do-sang Mok, Seoul, Rep. of Korea

[73] Assignee: Samsung Electronics Co., Ltd., Suwon, Rep. of Korea

[21] Appl. No.: 202,650

[22] Filed: Feb. 28, 1994

[30] Foreign Application Priority Data

Feb. 26, 1993 [KR] Rep. of Korea ............... 1993-2976

[51] Int. Cl.$^6$ ............................................. H04N 5/18
[52] U.S. Cl. .............................................. 348/697; 348/696
[58] Field of Search ................................. 348/695, 696, 348/697; 358/172; H04N 5/16, 5/18

[56] References Cited

U.S. PATENT DOCUMENTS

| | | | |
|---|---|---|---|
| 3,207,998 | 9/1965 | Corney | 348/697 |
| 4,562,471 | 12/1985 | Eouzan et al. | 348/697 |
| 4,631,589 | 12/1986 | Hongu et al. | 348/696 |
| 4,742,392 | 5/1988 | Hashimoto | 348/697 |
| 4,797,744 | 1/1989 | Klemmer et al. | 348/696 |
| 5,057,920 | 10/1991 | Wilkinson | 348/697 |
| 5,140,421 | 8/1992 | Sumiyoshi | 348/695 |
| 5,321,504 | 6/1994 | Mazet | 348/697 |
| 5,371,552 | 12/1994 | Brummette et al. | 348/697 |

FOREIGN PATENT DOCUMENTS

| | | | |
|---|---|---|---|
| 28562 | 3/1981 | Japan | 358/172 |
| 212068 | 10/1985 | Japan | 358/172 |
| 252070 | 10/1988 | Japan | H04N 5/18 |
| 261961 | 10/1988 | Japan | H04N 5/18 |
| 222580 | 10/1991 | Japan | H04N 5/18 |
| 167675 | 6/1992 | Japan | H04N 5/18 |
| 357775 | 12/1992 | Japan | H04N 5/16 |

*Primary Examiner*—Victor R. Kostak
*Assistant Examiner*—Chris Grant
*Attorney, Agent, or Firm*—Cushman Darby & Cushman

[57] ABSTRACT

A synchronizing signal clamping circuit for an integrated image signal processing circuit has an input buffer circuit for receiving a composite image signal; a level clamping circuit for clamping a synchronizing signal tip level of the composite image signal, in response to an error detecting signal; an error detecting circuit for detecting the difference between a reference voltage signal and the output synchronizing signal tip level of the composite image signal and for outputting the result as the error detecting signal, in response to a control signal; and a synchronizing signal interval distributor circuit which controls the error detecting circuit so that the error detecting circuit can detect the difference between said reference voltage signal and the synchronizing signal tip level of the composite image signal only for a period shorter than the interval of a synchronizing signal applied to a third input terminal.

8 Claims, 2 Drawing Sheets

SYNCHRONIZING SIGNAL CLAMPING CIRCUIT OF IMAGE SIGNAL PROCESSING INTEGRATED CIRCUIT

BACKGROUND OF THE INVENTION

The present invention relates to an integrated circuit for image signal processing, and more particularly, to a synchronizing signal clamping circuit which enables the integration of a normally external capacitor into the internal chip circuitry of the integral image signal processing circuit.

Signal processing circuit integration has progressed rapidly as video equipment such as VCRs and camcorders have become smaller and lighter in weight. In this field, integrated circuits are generally divided into those for luminance signal processing and those for chrominance signal processing. However, recently, the circuitry for both luminance and chrominance signal processing has been integrated into a single chip. Since an image signal is an analog signal, passive elements, e.g., capacitors and resistors, are required for the image signal processing integrated circuit. Capacitors and resistors having relatively large values occupy excessive chip area. Therefore, such elements cannot be integrated into the chip internally but can be used if connected as an external passive component.

As will be appreciated by one of ordinary skill in the art, whenever external elements are utilized in conjunction with integrated circuitry, the number of pins of the integrated circuit must be increased. Thus, a larger circuit board layout area is required and product assembly time increases, which ultimately increases cost. Moreover, it is desirable to integrate external elements onto the chip in order to increase the number of pins available for performing additional functions.

In a conventional synchronizing signal keyed clamping circuit of an integrated image signal processing circuit, a capacitor is used to detect an error voltage during a "high" interval of the synchronizing signal. This function requires a large capacitance, such that the capacitor cannot be integrated into the chip. Therefore, a large external capacitor, e.g., 4.7 µF, is connected to the synchronizing signal keyed clamping circuit via pins of the integrated image signal process circuit. This increases the required number of pins and increases the cost of chips including the conventional synchronizing signal keyed clamping circuit. Further, the external placement of the passive component unfavorably expands the circuit board layout.

SUMMARY OF THE INVENTION

It is an object of the present invention to provide a synchronizing signal clamping circuit which reduces the number of required pins by using a small internal capacitor instead of a large external capacitor.

It is another object of the present invention to provide a synchronizing signal clamping circuit for an integrated image signal processing circuit which reduces product manufacturing costs by eliminating connections to an external passive element.

To accomplish the above objects, the present invention provides for a synchronizing signal clamping circuit of an integrated image signal processing circuit, the synchronizing signal clamping circuit comprising:

an input buffer circuit for receiving a composite image signal applied to a first input terminal;

a level clamping circuit for clamping a synchronizing signal tip level of the composite image signal output from the input buffer circuit, in response to an error detecting signal;

an output buffer circuit for receiving the synchronizing signal tip level of the composite image signal clamped in the level clamping circuit and for outputting the clamped synchronizing signal tip level of the composite image signal to an output terminal;

an error detecting circuit for detecting the difference between a reference voltage signal provided to a second input terminal and the clamped synchronizing signal tip level of the composite image signal and for outputting the detected difference as an error detecting signal, in response to a control signal; and a synchronizing signal interval distributor circuit for generating the control signal which controls the error detecting circuit so that the error detecting circuit can detect the difference between the reference voltage signal and the clamped synchronizing signal tip level of the composite image signal during a period shorter than the interval of the synchronizing signal in response to a synchronizing signal applied to a third input terminal.

The level clamping circuit comprises input means for receiving the error detecting signal, and a current mirror for adjusting the tip level of the synchronizing signal of the composite image signal input via the input buffer circuit to a certain level, in response to a current signal that corresponds to the change in the error detecting signal input to the input means.

The error detecting circuit comprises differential amplifying means for amplifying the difference between the reference voltage signal and the clamped composite image signal output to the output terminal and outputting the result, in response to the control signal, a capacitor which is charged or discharged by the differential amplifying means, and level shifting means for level-shifting an electrode voltage of the capacitor and for outputting the level-shifted voltage as the error detecting signal.

The synchronizing signal interval distributor circuit comprises a voltage distributing means for distributing a power supply voltage and for generating first, second and third reference voltages, means for providing the second reference voltage, as the reference voltage signal, at a "high" interval of the synchronizing signal, driving means for providing a charging current at a "high" interval of the synchronizing signal and for providing a discharging path at a "low" interval of the synchronizing signal, a capacitor charged or discharged by the driving means, limiting means for limiting the electrode voltage of the capacitor to voltages between the first reference voltage and the third reference voltage, differential amplifying means for differentially amplifying the second reference voltage and the electrode voltage of the capacitor adjusted by the limiting means, and a current mirror for outputting the control signal in response to the output of the differential amplifying means.

The synchronizing signal interval distributor circuit adjusts an active interval set for detecting an error from the leading end of the synchronizing signal according to a charge current value set of the driving means.

Accordingly, the present invention allows the use of an integrated small capacitor instead of a large volume external capacitor by making the error detecting interval of a synchronizing signal shorter than the entire interval of the synchronizing signal. An error detecting circuit charges the capacitor with an error detecting voltage detected during a predetermined time from a leading edge of a synchronizing signal, and holds the electrode voltage of the capacitor during a "high" interval of a synchronizing signal, to thereby clamp the entire "high" interval of the synchronizing signal.

In addition, a synchronizing signal interval distributor circuit generates a control signal which shortens error detection time and activates the control signal only during the predetermined time from the leading edge of the synchronizing signal, to thereby control the operation of the error detecting circuit.

BRIEF DESCRIPTION OF THE DRAWINGS

The above objects and other advantages of the present invention will become more apparent upon consideration of the following detailed description of a preferred embodiment thereof with reference to the attached drawings in which.

DETAILED DESCRIPTION OF THE INVENTION

Figure 1:
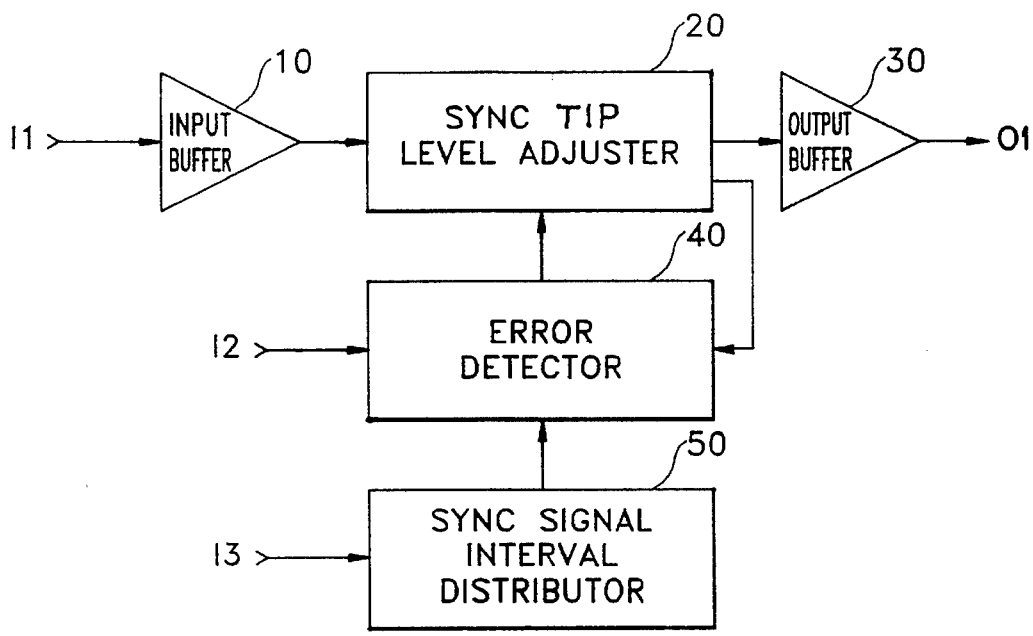
FIG. 1 is a block diagram of a synchronizing signal clamping circuit according to the present invention.

Referring to FIG. 1, a synchronizing signal clamping circuit of an integrated image signal processing circuit comprises an input buffer circuit 10 for receiving a composite image signal applied to a first input terminal I1, a level clamping circuit 20 for clamping a synchronizing signal tip level of the composite image signal output from the input buffer, in response to an error detecting signal, an output buffer circuit 30 for receiving the synchronizing signal tip level of the composite image signal clamped in the level clamping circuit 20 and for outputting the received signal to output terminal O1, an error detecting circuit 40 for detecting the difference between the clamped synchronizing signal tip level of the composite image signal and a reference voltage signal which is provided to a second input terminal I2 during a synchronizing signal interval of the clamped composite image signal and for outputting the detected difference as an error detecting signal, a synchronizing signal interval distributor circuit 50 for generating a control signal which controls the error detecting circuit, in response to the synchronizing signal applied to a third input terminal I3, so that the error detecting circuit can detect the difference between the clamped composite image signal and the reference voltage signal only for an interval shorter than the interval of the synchronizing signal and maintain the error detecting signal which corresponds to the detected difference during an interval longer than synchronizing signal interval.

Figure 2:
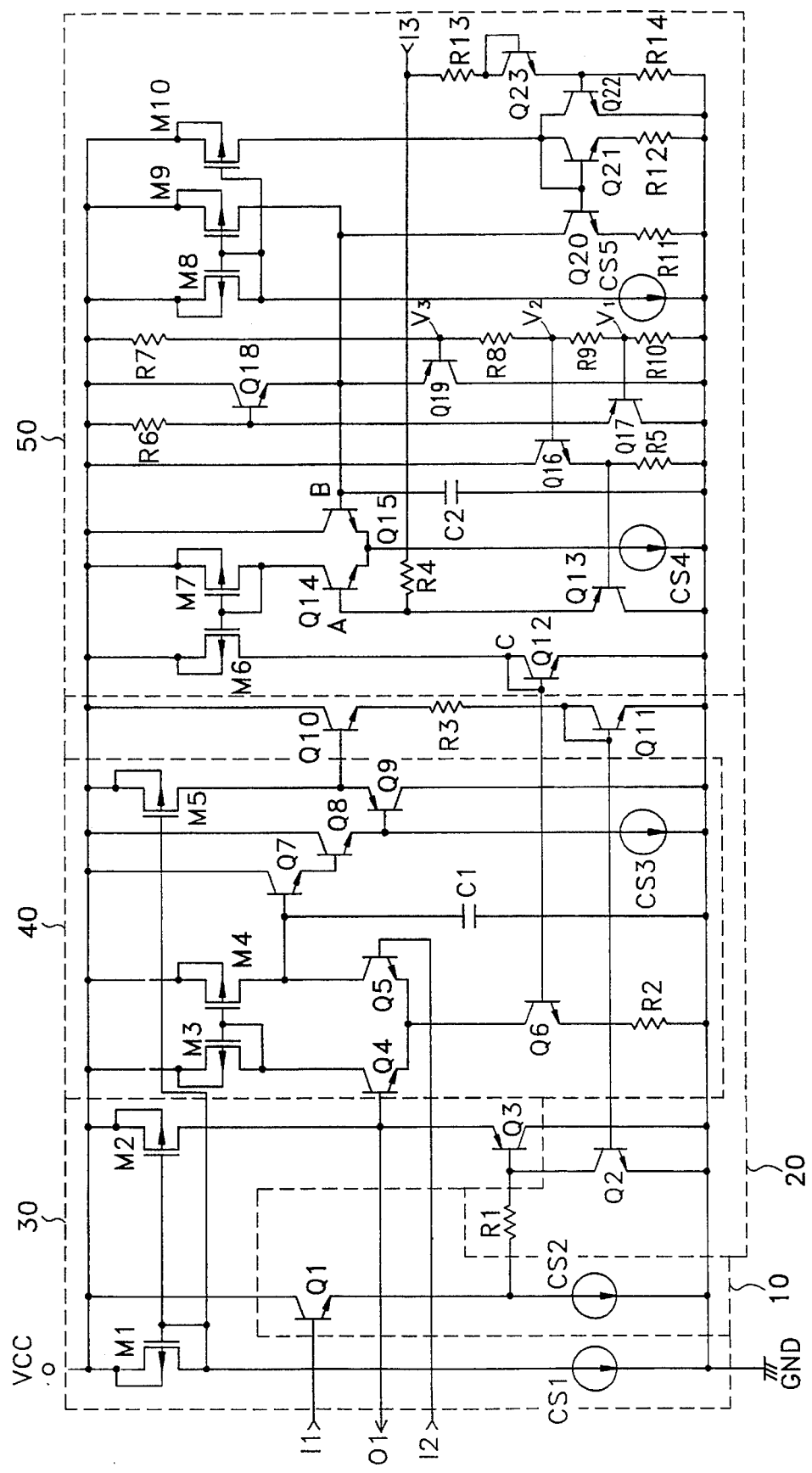
FIG. 2 shows a synchronizing signal clamping circuit according to a preferred embodiment of the present invention.

Referring to FIG. 2, input buffer circuit 10 comprises an NPN bipolar transistor Q1 for ouputting the synchronizing signal tip level of a composite image signal applied to a base through an emitter and a current source CS2 coupled to the emitter.

Level clamping circuit 20 comprises an NPN bipolar transistor Q10 for receiving the error detecting signal at its base, current mirrors Q2 and Q11 for regulating the tip level of a synchronizing signal of the composite image signal input via input buffer circuit 10 to a certain level, in response to the current signal which corresponds to the change in an error detecting signal input to input means Q10, a resistor R1 connected between the emitter of transistor Q1 of buffer circuit 10 and the collector of current mirror Q2, and a resistor R3 connected between an emitter of Q10 and a collector of Q11.

Output buffer circuit 30 comprises a PNP bipolar transistor Q3 for receiving at its base the synchronizing signal tip level of the composite image signal wherein the synchronizing signal tip level is adjusted, and for outputting the adjusted synchronizing signal tip level of the composite image signal through an output terminal O1 connected to an emitter and a current source connected to the emitter. The current source includes current source CS1 and another current mirror comprising a pair of PMOS transistors M1 and M2.

Error detecting circuit 40 comprises emitter coupling differential amplifying means Q4, Q5, M3, M4, Q6 and R2 for amplifying the difference between the reference signal and the adjusted synchronizing signal tip level of the composite image signal output to output terminal O1 and for outputting the result in response to a control signal, a capacitor C1 which is charged and discharged by the differential amplifying means, and level shifting means Q7, Q8, Q9, M5 and CS3 for level-shifting the electrode voltage of capacitor C1 and for outputting the level-shifted signal as an error detecting signal. Here, M5 forms a current mirror together with M1.

Synchronizing signal interval distributor circuit 50 comprises: voltage distributing means R7–R10 for distributing a supplied power voltage (Vcc) and for generating first, second and third reference voltages V1, V2 and V3; means for providing second reference voltage V2 as a reference signal during a "high" interval of the synchronizing signal and which comprises an NPN bipolar transistor Q16 for receiving second reference voltage V2 at the base and outputting the result via the emitter, an emitter resistor R5 connected to the emitter of transistor Q16 and a PNP bipolar transistor Q13 whose base is connected to the emitter of Q16 and whose emitter is coupled with a synchronizing signal via resistor R4; a driving circuit comprising an NPN bipolar transistor Q22 whose base is connected to a synchronizing signal via transistor Q23 and resistor R13 in order to supply a charge current during a "high" interval of the synchronizing signal and a discharge current during a "low" interval of the synchronizing signal, current mirrors Q20 and Q21 having a current source connected to the collector of Q22, current sources M8, M9, M10 and CS5 and resistors R11, R12 and R14; a capacitor C2 which is charged and discharged by the driving circuit; limiting means comprising a PNP bipolar transistor Q17 whose base is supplied with first reference voltage V1 and whose collector is grounded in order to adjust the electrode voltage of capacitor C2 to be increased and decreased linearly between first reference voltage V1 and third reference voltage V3, an NPN bipolar transistor Q18 whose base is connected to the emitter of transistor Q17 and whose emitter is connected to capacitor C2, a PNP bipolar transistor Q19 whose base is supplied with third reference voltage V3, whose emitter is connected to capacitor C2 and whose collector is grounded and a resistor R6 connected between the base and the power voltage of NPN bipolar transistor Q18; differential amplifying means Q14, Q15 and CS4 for differentially amplifying an electrode voltage of capacitor C2 adjusted by second reference voltage V2 and the limiting means; and current mirrors M6, M7 and Q12 for outputting the control signal, in response to the output of the differential amplifying means. Here, NPN bipolar transistor Q12 forms a current mirror together with an NPN bipolar transistor Q6.

The operations and effects of the present invention as described above can be explained with reference to FIG. 3, as follows.

Figure 3A:
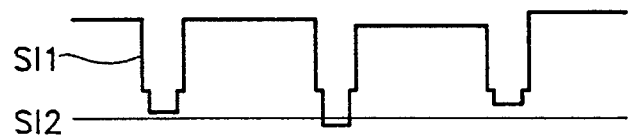
FIGS. 3A–3E show waveforms of the respective portions of the circuit of FIG. 2.
Figure 3B:
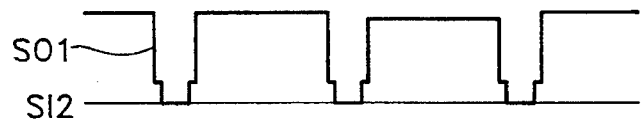

FIG. 3A shows the relationship between the waveforms of a synchronizing signal of a composite image signal (SI1) and reference voltage signal (SI2) applied to input terminals I1 and I2 of FIG. 2, respectively. As shown in FIG. 3A, synchronizing tip levels of the input composite image signal (SI1) are irregular. Therefore, clamping is required to adjust the synchronizing tip level to conform with regular levels of reference voltage signal SI2. To achieve this, the composite image signal (SI1) input to input buffer circuit 10 is applied to resistor R1 of level clamping circuit 20 via transistor Q1. In level clamping circuit 20, the collector current of NPN bipolar transistor Q11 is determined by an error detecting signal and the collector current of NPN bipolar transistor Q2 is determined by the collector current and a current mirror of transistor Q11 and NPN bipolar transistor Q2. Thus, the collector current of NPN bipolar transistor Q2 changes the voltage drop across resistor R1. Accordingly, the error detecting signal, which is generated by the comparison between the synchronizing signal tip level of the composite image signal and the reference voltage signal level, controls the voltage drop across resistor R1. As a result, the synchronizing signal tip level of the composite image signal (SO1) output via output buffer circuit 30 is set (clamped) to the level of reference voltage signal (SI2), as shown in FIG. 3B.

Figure 3C:
Figure 3D:
Figure 3E:
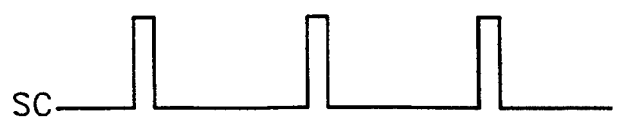

Error detecting circuit 40 for outputting an error detecting signal is activated during a "high" interval of a control signal (SC), as shown in FIG. 3E. Transistors Q4 and Q5 compare the synchronizing signal tip level of the composite image signal and the reference voltage signal at a "high" interval of the control signal (SC) and detect the difference. Then, capacitor C1 is charged and discharged according to the detected difference signal. The electrode voltage of capacitor C1 is level-shifted through NPN bipolar transistors Q7, Q8 and Q9 and output as an error detecting signal.

Synchronizing signal interval distributor circuit 50 receives a synchronizing signal (SI3) applied to input terminal (I3), as shown in FIG. 3C. The synchronizing signal tip level is made equivalent to reference voltage V2 by transistors Q13 and Q16 and is changed into the reference signal SA shown in FIG. 3D, and applied to the base of transistor Q14. That is, the above synchronizing signal interval distributor circuit 50 cuts off the synchronizing signal tip level higher than reference voltage V2. Meanwhile, the synchronizing signal turns off the driving circuit during "high" intervals via resistor R13 and transistors Q22 and Q23 and turns on the driving circuit at the "low" interval. Capacitor C2 is charged when the driving circuit is turned off and is discharged when the driving circuit is turned on. Transistor Q18 is turned on when the electrode voltage of capacitor C2 is lower than the first reference voltage (V1) so that the current is provided to capacitor C2. Transistor Q18 is turned off when the electrode voltage of capacitor C2 is higher than the first reference voltage (V1). As a result, capacitor C2 is driven only by the driving circuit. Whenever the electrode voltage of capacitor C2 is higher than the value of $V3+V_{EB(Q19)}$, transistor Q19 is turned on so as to form a discharge path, to thereby limit the electrode voltage of capacitor C2 from being charged higher than $V3+V_{EB(Q19)}$. Accordingly, as shown in signal SB of FIG. 3D, a base of transistor Q15 is charged at the "high" interval of the synchronizing signal and the discharged signal is applied at the "low" interval. These two signals SA and SB are compared by transistors Q14 and Q15, and the collector current of transistor Q14 flows only when SA is higher than SB. The collector current of transistor Q14 is supplied to transistor Q12 via current mirrors M6 and M7 and the drain current of current mirror M6 is supplied to the collector current of transistor Q6 by current mirrors Q12 and Q6. Therefore, since transistor Q6 is turned on only when the collector current of transistor Q14 flows, error detecting circuit 40 performs a detecting operation only at a "high" interval of the synchronizing signal shown in FIG. 3E. That is, synchronizing signal interval distributor circuit 50 limits an error detecting period of the synchronizing signal tip level to be about a half of the entire interval of the conventional synchronizing signal.

Accordingly, in the present invention, an error detecting operation is controlled by establishing a predetermined time period which is shorter than the "high" interval of the synchronizing signal in synchronizing signal interval distributor circuit 50 without charging an error detecting voltage for the "high" interval of the synchronizing signal. As a result, the charge and discharge time of capacitor C1 can be reduced, to thereby allow integration of a capacitor into a small volume chip. That is, the required capacitance can be reduced by a factor of about $10^6$, such as from a large value in the micro farad range to a small value in the pico farad range. As a result, the pin for use in connecting the external capacitor can be removed, thereby reducing the number of pins necessary for a given integrated circuit. Further, the external large value capacitor can be removed, which reduces the area occupied by such an integrated circuit on a circuit board. Moreover, the assembly process is simplified, thereby reducing production costs.

What is claimed is:

1. A synchronizing signal clamping circuit for an integrated image signal processing circuit, comprising:

an input buffer circuit receiving a composite image signal applied to a first input terminal;

a level clamping circuit for clamping a synchronizing signal tip level of said composite image signal received by said input buffer circuit to a clamped synchronizing signal having a clamped tip level in response to an error detecting signal, said level clamping circuit including:
input means receiving said error detecting signal, and
a current mirror adjusting said synchronizing signal tip level to a certain level, in response to a current signal corresponding to said error detecting signal input to said input means;

an output buffer circuit receiving said clamped synchronizing signal tip level and outputting the result to an output terminal;

an error detecting circuit detecting a difference between a reference voltage signal provided to a second input terminal and said clamped synchronizing signal tip level and outputting said difference as said error detecting signal, in response to a control signal; and a synchronizing signal interval distributor circuit generating said control signal to control said error detecting circuit so that said error detecting circuit detects said difference between said reference voltage signal and said clamped synchronizing signal tip level only for a period of time shorter than an interval of time during which a synchronizing signal applied to a third input terminal is at an active level.

2. A synchronizing signal clamping circuit for an integrated image signal processing circuit, comprising:

an input buffer circuit receiving a composite image signal applied to a first input terminal;

a level clamping circuit for clamping a synchronizing signal tip level of said composite image signal received by said input buffer circuit to a clamped synchronizing signal having a clamped tip level in response to an error detecting signal;

an output buffer circuit receiving said clamped synchronizing signal tip level and outputting the result to an output terminal;

an error detecting circuit detecting a difference between a reference voltage signal provided to a second input terminal and said clamped synchronizing signal tip level and outputting said difference as said error detecting signal, in response to a control signal; and a synchronizing signal interval distributor circuit generating said control signal to control said error detecting circuit so that said error detecting circuit detects said difference between said reference voltage signal and said clamped synchronizing signal tip level only for a period of time shorter than an interval of time during which a synchronizing signal applied to a third input terminal is at an active level, said synchronizing signal interval distributor circuit including:

voltage distributing means for distributing a power voltage and for generating a first reference voltage, a second reference voltage, and a third reference voltage, means for providing said second reference voltage as a reference signal at a "high" interval of said synchronizing signal, a capacitor:

driving means, connected to said capacitor, for providing a charge current to said capacitor at said "high" interval of said synchronizing signal and for providing a discharge path for said capacitor at a "low" interval of said synchronizing signal, limiting means for limiting an electrode voltage at an electrode of said capacitor to be at a level between a level of said first reference voltage and a level of said third reference voltage, differential amplifying means for differentially amplifying said second reference voltage and said electrode voltage of said capacitor limited by said limiting means, and a current mirror outputting said control signal, in response to an output of said differential amplifying means.

3. A synchronizing signal clamping circuit according to claim 2, wherein said synchronizing signal interval distributor circuit adjusts an active interval of time during which an error is detected from a leading edge of said synchronizing signal, in correspondence with said charge current of said driving means.

4. A synchronizing signal clamping circuit for an image signal processing integrated circuit, comprising:

a level clamping circuit which receives a composite image signal and an error signal, clamps a synchronizing signal tip level of said composite image signal to a clamped synchronizing signal having a clamped tip level in response to said error signal;

an error signal generation circuit which receives a control signal, a reference voltage signal, and said clamped synchronizing signal having said clamped tip level, and generates said error signal corresponding to a difference between said reference voltage signal and said clamped synchronizing signal having said clamped tip level in response to said control signal; and a control signal generator circuit which receives a synchronizing signal and generates said control signal such that said error signal generation circuit generates said error signal only for a period of time shorter than an interval of time during which said synchronizing signal is at an active level.

5. A synchronizing signal clamping circuit according to claim 4, wherein said level clamping circuit includes a current mirror.

6. A synchronizing signal clamping circuit for an image signal processing integrated circuit, comprising:

a level clamping circuit which receives a composite image signal and an error signal, clamps a synchronizing signal tip level of said composite image signal to a clamped synchronizing signal having a clamped tip level in response to said error signal;

an error signal generation circuit which receives a control signal, a reference voltage signal, and said clamped synchronizing signal having said clamped tip level, and generates said error signal corresponding to a difference between said reference voltage signal and said clamped synchronizing signal having said clamped tip level in response to said control signal, said error signal generation circuit including:

a differential amplifier amplifying said difference between said reference voltage signal and said clamped synchronizing signal having said clamped tip level;

a capacitor charged and discharged by said differential amplifier; and a level-shifter which shifts a voltage level of an electrode voltage of said capacitor and outputs the result as said error signal; and a control signal generator circuit which receives a synchronizing signal and generates said control signal such that said error signal generation circuit generates said error signal only for a period of time shorter than an interval of time during which said synchronizing signal is at an active level.

7. A synchronizing signal clamping circuit for an image signal processing integrated circuit, comprising:

a level clamping circuit which receives a composite image signal and an error signal, clamps a synchronizing signal tip level of said composite image signal to a clamped synchronizing signal having a clamped tip level in response to said error signal;

an error signal generation circuit which receives a control signal, a reference voltage signal, and said clamped synchronizing signal having said clamped tip level, and generates said error signal corresponding to a difference between said reference voltage signal and said clamped synchronizing signal having said clamped tip level in response to said control signal; and a control signal generator circuit which receives a synchronizing signal and generates said control signal such that said error signal generation circuit generates said error signal only for a period of time shorter than an interval of time during which said synchronizing signal is at an active level, said control signal generator circuit including:

means for generating a first reference voltage, a second reference voltage, and a third reference voltage from a supply voltage, said second reference voltage providing said reference voltage signal during a "high" interval of said synchronizing signal;

a capacitor having an electrode;

driving means for charging said capacitor during said "high" interval of said synchronizing signal, and for discharging said capacitor during a "low" interval of said synchronizing signal;

means for limiting a voltage level of said electrode to a voltage level between said first reference voltage and said third reference voltage;

a differential amplifier which receives said second reference voltage and said voltage level of said electrode, and amplifies a difference between said second reference voltage and said voltage level of said electrode; and a current mirror which outputs said control signal in response to an output of said differential amplifier.

8. A synchronizing signal clamping circuit according to claim 7, wherein said period of time in which said error signal generation circuit generates said error signal is adjusted by said control signal generator circuit.

* * * * *